United States Patent [19]

Rueffel

[11] 4,231,885

[45] Nov. 4, 1980

[54] THERMAL ENERGY STORAGE COMPOSITION COMPRISING PEAT MOSS

[75] Inventor: Philip G. Rueffel, Prince Albert, Canada

[73] Assignee: Saskatchewan Minerals, Chaplin, Canada

[21] Appl. No.: 56,837

[22] Filed: Jul. 12, 1979

[51] Int. Cl.$^2$ .............................................. C09K 5/06
[52] U.S. Cl. .................................................... 252/70
[58] Field of Search .................. 252/70; 126/400, 900, 126/430, 436

[56] References Cited

U.S. PATENT DOCUMENTS 3,986,969  10/1976  Telkes ..................................... 252/70

Primary Examiner—Harris A. Pitlick
Attorney, Agent, or Firm—Ernest Peter Johnson

[57] ABSTRACT

Peat moss is used in a thermal energy storage composition to provide a network in which to trap an incongruently melting salt hydrate capable of storing thermal energy as latent heat of phase change. The peat moss network is effective in preventing the segregation of a dehydrated form of the salt between heating and cooling cycles. In a preferred embodiment that salt hydrate is the decahydrate of sodium sulphate. A nucleating agent such as sodium tetraborate decahydrate is included to prevent supercooling in the composition, and promote crystallization of the decahydrate of sodium sulphate.

16 Claims, 1 Drawing Figure

THERMAL ENERGY STORAGE COMPOSITION COMPRISING PEAT MOSS

BACKGROUND OF THE INVENTION

The present invention relates to a low temperature thermal energy storage composition which utilizes the latent heat of phase change to store heat.

Low temperature thermal storage materials are well known in the prior art. Rocks, water and other fluids are often used, however the excessive bulk and weight of the material needed to store a sufficient amount of heat deters one from their use. The use of thermochemical heat storage, wherein the latent heat of a phase change is utilized, permits one to achieve compactness of the heat storage material.

Materials suitable for heat of phase change storage have a number of desirable properties, among which are a phase change in a practical temperature range (usually about 90–200° F.), a high energy density (that is, a high latent heat of phase change per unit volume), and low cost.

One such heat of phase change material is the decahydrate of sodium sulphate, also known as Glauber's Salt or Mirabilite, occurring naturally or produced synthetically. It has the chemical formula $Na_2SO_4.10H_2O$. Glauber's Salt is particularly attractive because it is readily available, inexpensive, and non-toxic, and the storage space required is small when compared to non-latent heat type storage materials. For instance, as related by Mr. F. Lindner in a paper given at the Energy and Politics Forum of the Government of Baden-Wuerttemberg at the University of Stuttgart, May, 1977, to attain an equivalent heat storage capacity, a quantity of rocks 34 times heavier and 27 times larger, or a quantity of water 6.5 times heavier and 11.5 times larger than Glauber's Salt would be needed.

Glauber's Salt is known to melt in the crystal-bound water at a moderate temperature of 90.8° F., storing approximately 108 BTU/lb. as latent heat of phase change. Recrystallization of the melt as it is cooled releases the majority of this stored energy as recoverable heat.

The use of Glauber's Salt as a heat storage material is reported in U.S. Pat. Nos. 2,677,664 and 3,986,969, issued to Telkes.

At least two major problems exist in any attempt to utilize the salt hydrate for heat storage.

Firstly, upon cooling a melt of Glauber's Salt the mixture tends to exhibit supercooling and thus the latent heat of recrystallization is not fully recoverable. Telkes, in U.S. Pat. No. 2,677,667 found that the problem of supercooling could be overcome with the addition of a nucleating agent. Particularly, sodium tetraborate decahydrate ($Na_2B_4O_7.10H_2O$) has been proven to be effective.

Secondly, Glauber's Salt, on melting, exhibits incongruent melting; that is, two new phases are formed. One such phase is a metastable supersaturated aqueous solution of sodium sulphate, the water of solution being wholely derived from the water of hydration of Glauber's Salt representing 56% of the original mass. The other phase is solid anhydrous sodium sulphate, representing approximately 18% of the original mass of the unmelted Glauber's Salt; this latter phase, having a density of approximately twice that of the solution phase, settles to form a layer on the bottom of the container. On cooling, the sodium sulphate dissolved in the solution phase begins to rehydrate with the water of solution to form Glauber's Salt crystals which, having a higher density than the surrounding solution, settle on top of the layer of anhydrous sodium sulphate, thereby preventing a large fraction of this material from rehydrating with the water of solution upon further cooling. This large fraction is thus removed from further use for heat storage, reducing the heat storage capacity of the system.

One solution to the problem of segregation resulting from incongruent melting has been to apply mechanical mixing to the melted solution and settled or segregated layer of anhydrous sodium sulphate. As developed by Herrick and reported in Business Week, Jan. 16, 1978, the unmelted Glauber's Salt is filled and sealed into a cylindrical container. After melting and during cooling and further cycling, the cylinder is continuously rotated slowly with its axis in the horizontal plane causing the segregated layer of anhydrous sodium sulphate to be lifted and then overturned through the bulk of the solution, whereby substantial rehydration may be encouraged. However, this method suffers from the disadvantage of requiring extra input of mechanical energy derived from an external power source and maintenance of a rotating drive and suspension system.

Another approach reported by D. D. Edie and S. S. Melsheimer in "Sharing the Sun", Volume 8, 1976, Pages 262 to 272 considers providing agitation and turbulence of the anhydrous sodium sulphate phase by circulating an immiscible fluid of lower density than the salt solution from the bottom to the top of the container. The bubbling action of the immiscible fluid flowing up through the bulk serves to stir up the anhydrous layer, thus exposing it to rehydration during cooling. In this approach, an additional energy expense in the form of fluid pumping is required to accomplish the objective of rehydrating the segregated anhydrous salt.

A better approach to this problem appears to be the provision of a type of lattice network or dispersant to keep the anhydrous salt suspended or trapped within the bulk of the solution. Telkes, in U.S. Pat. No. 3,986,969, has taught suspending the salt hydrate in a thixotropic gel, as provided by an aqueous solution of attapulgite clay.

The present applicant has investigated this clay-salt mixture and has found, after subjecting it to a number of heat-cool cycles, that the thixotropic gel can break down, allowing a portion of the anhydrous salt to settle out of solution.

SUMMARY OF THE INVENTION

The inventor has discovered that peat moss provides an excellent lattice network in which to trap or suspend an incongruently melting salt hydrate. Thus, in accordance with the present invention, a thermal energy storage composition is provided which comprises an incongruently melting salt hydrate, capable of storing thermal energy as latent heat of phase change, and a nucleating agent, both being trapped in a network of peat moss. The composition has been shown to be effective with Glauber's Salt.

While not wishing to be bound by this explanation, it appears that the ability of peat moss to form a network in which to effectively trap anhydrous sodium sulphate is due to the reabsorptive properties of peat moss. Peat moss occurs in nature containing up to 96% water. A large portion of this water can be removed and reabsorbed through a number of cycles without destroying the bulk appearance of the peat. It is believed that the peat moss, in the composition of the present invention, absorbs the solution created by melting the Glauber's Salt. Both the solution and the anhydrous salt are trapped in the network of peat fibres, holding both components in close proximity for rehydration of the salt as the composition is cooled.

To form this novel heat storage composition, the peat moss is dried, preferably to a moisture content of 10 to 30%, and preferably mascerated to reduce the fiber size of the peat, preferably in the range of 1-3 mm. The peat is then mixed with an incongruently melting salt hydrate, such as Glauber's Salt, and a nucleating agent, such as sodium tetraborate decahydrate. This mixture is then heated to at least the phase change temperature of the incongruently melting salt hydrate and preferably 5° to 10° F. higher, to form a melt, whereby the anhydrous salt, the nucleating agent and the solution formed on phase change are held in the peat network. On cooling, the anhydrous salt rehydrates, and the salt hydrate and nucleating agent remain trapped in the network of peat moss.

Preferably, the peat moss used in the heat storage composition is sphagnum peat, included on a dry weight basis of peat in at least 7%.

The nucleating agent is preferably sodium tetraborate decahydrate included in the composition in an amount of about 3% by weight.

DESCRIPTION OF THE PREFERRED EMBODIMENT

Figure 1:
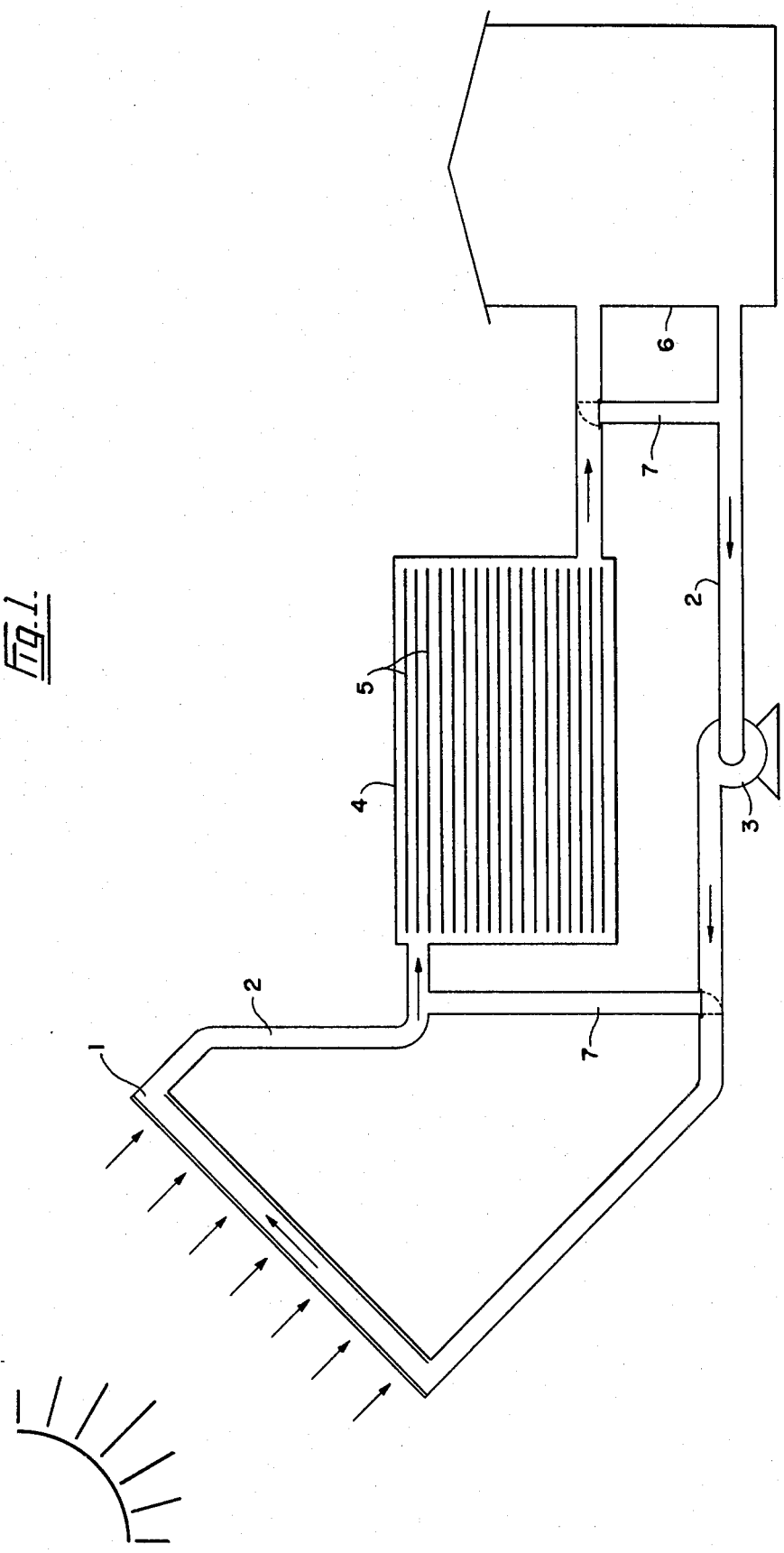
FIG. 1 of the Drawing is a schematic of a solar energy storage unit utilizing the thermal energy storage composition of the present invention.

The present invention seeks to provide a solution to the problem of segregation arising from incongruent melting of salt hydrates being used in thermal energy storage. The most preferred salt hydrate is the decahydrate of sodium sulphate, however other incongruently melting salt hydrates having favorable heat storage properties could be applicable. Exemplary of other heat of phase change compounds which may be suitable are: sodium thiosulphate pentahydrate, sodium carbonate decahydrate, and various eutectic salt mixtures incorporating sodium sulphate decahydrate.

The thermal energy storage composition includes the incongruently melting salt hydrate and a nucleating agent dispersed in a network of peat moss.

Three types of peat moss are known and are biologically classified as sphagnum, reed-sedge and humus peat moss. The present invention has been demonstrated with sphagnum peat moss, which, on the basis of low cost, ready availability, excellent absorptive properties and high bulk/weight ratio, appears to be the most preferred type of peat moss to employ. The other peat moss types do however have good absorptive properties and varying bulk/weight ratios. Thus a ready supply of these peats may render them suitable for the purposes of the present invention.

Naturally occurring sphagnum peat moss can contain as much as 96% by weight water. Much of this water is removed in commercial draining and drying processes to reduce the moisture level to approximately 35 to 50% by weight. Although peat moss having such high moisture contents can be used in the composition, the excess water necessarily dilutes the salt hydrate, and thereby reduces the latent heat storage capacity or energy density of the system. Generally, the lower the water content included in excess of the crystal-bound water in the salt hydrate, the greater the energy density of the system.

Thus in a preferred composition, the sphagnum peat moss is dried to as low as 10% by weight water by heating the peat in an oven at a temperature less than about 150° F. Higher drying temperatures and lower moisture contents should be avoided since they tend to destroy the reabsorptive properties of the peat.

Additionally, the sphagnum peat moss should be mascerated or ground to reduce the fibre size. This has been found to improve the ability of the peat moss network to effectively trap the anhydrous salt. Unmascerated peat moss comprising the naturally occurring long fibres of peat is not as effective in trapping the anhydrous salt. Thus a finer network is desired. Conversely, reducing the fibre size below about 1 mm. and drying below 10% moisture, reduces the wetability of the peat, which makes subsequent blending difficult. A fibre size in the range of 1-3 mm. has been found effective.

A nucleating agent should be included in the heat storage composition to overcome the problem of supercooling and promote nucleation of the decahydrate of sodium sulphate. As provided by the teachings of the Telkes patents, an effective nucleating agent is sodium tetraborate decahydrate.

In accordance with the above teachings a suitable and most preferred thermal energy storage composition includes in approximate weight percentages:
  90% Glauber's Salt;
  7% mascerated sphagnum peat (on dry weight basis) having a moisture content of about 10%; and
  3% sodium tetraborate decahydrate.

This heat storage composition has thus far been subjected to more than 100 heat-cool cycles with no visible signs of either water or anhydrous salt separation.

The present applicant has found that 7% sphagnum peat moss, calculated on a dry weight basis of peat, is approximately the minimum amount of peat moss which can be included which will effectively keep the anhydrous salt trapped. For practical purposes, the amount of Glauber's Salt included should be maximized to achieve a high heat storage capacity in the composition. In the above described composition, the heat storage capacity is approximately 95 BTU/lb. of composition.

The abovedescribed composition has been disclosed with the decahydrate of sodium sulphate, which is readily available in many locations in this hydrated form. While it is preferred to utilize this form of the salt, it will be realized that in many locations the decahydrate is not available. In such cases it may be possible to rehydrate the anhydrous form of sodium sulphate; however it is difficult to achieve the 56% water, 44% sodium sulphate ratio naturally present in Glauber's Salt. Additionally, compositions prepared from the anhydrous salt are already segregated, lowering the heat storage capacity of the system.

To form a suitable heat storage composition, the mascerated sphagnum peat moss may first be dry mixed with Glauber's Salt and the nucleating agent. The mixture is then heated with mixing to at least the temperature of phase change, or somewhat higher, in this case to about 95° F. This temperature is maintained to form a melt of the mixture wherein the solution and anhydrous sodium sulphate phases thus formed are blended substantially uniformly through the network formed by the peat moss. On cooling the composition, the anhydrous salt in close proximity to the water of hydration can rehydrate, releasing the latent heat of phase change.

To utilize the abovedescribed thermal energy storage composition in a heating embodiment it is generally combined with a source of thermal energy, the availability of which does not correspond with demand, and a heat transfer medium capable of transferring thermal energy between the source, the storage composition and a space to be heated.

In the embodiment shown in FIG. 1, the composition is included in a simplified solar heating system. It should be understood that the composition could be used with a number of thermal energy sources. For instance, electrical energy could be stored at off-peak demand hours for load levelling of energy demands on utilities.

The solar heating system includes a solar collector 1 which is effective in absorbing heat from the solar rays. Conventional air or water pan collectors or more efficient vacuum tube collectors are well known in this art. A heat transfer medium 2, in this case air, is circulated by way of blower 3 over or through the solar collectors and into a heat storage unit 4 containing the heat storage composition.

The heat storage composition is preferably contained and sealed in shallow containers 5, commonly referred to as trays. In this way the surface area/volume ratio, which is a limiting factor of heat exchange, is maximized.

Once the temperature of the space to be heated has fallen below comfortable limits, as determined by thermostat control, air is circulated over the heat composition and through the heated space 6. Bypass ducts 7, may be appropriately employed either when solar energy is not available or space heating is not required.

While the thermal energy storage composition has been disclosed in a heating embodiment, it should be understood the composition is also effective for cooling purposes. In this case, the latent heat of crystallization is used to remove thermal energy from the space to be cooled via the heat transfer medium. The expression "utilizing the latent heat of phase change to store thermal energy" is meant to include both heating and cooling purposes.

While the present invention has been disclosed in connection with preferred embodiments thereof, it should be understood that there may be other embodiments which fall within the spirit and scope of the invention as defined in the following claims.

The embodiments of the invention in which an exclusive property or privilege is claimed are defined as follows:

1. A thermal energy storage composition which utilizes latent heat of phase change to store thermal energy comprising:
    an incongruently melting salt hydrate, capable of storing thermal energy as latent heat of phase change, and a nucleating agent, both being trapped in a network of peat moss.

2. The thermal energy storage composition as set forth in claim 1 wherein the salt hydrate is the decahydrate of sodium sulphate.

3. The thermal energy storage composition as set forth in claim 2 wherein the peat moss is mascerated sphagnum peat moss.

4. The thermal energy storage composition as set forth in claim 3 wherein the nucleating agent is sodium tetraborate decahydrate, contained in the composition in the amount of approximately 3% by weight.

5. The thermal energy storage composition as set forth in claim 4 wherein at least 7% sphagnum peat moss on a dry weight basis of peat is included.

6. The thermal energy storage composition as set forth in claim 3 wherein at least 7% sphagnum peat moss on a dry weight basis of peat is included.

7. The thermal energy storage composition as set forth in claim 5 wherein the moisture content of the sphagnum peat moss is in the range of approximately 10 to 30% by weight.

8. The thermal energy storage composition as set forth in claim 6 wherein the moisture content of the sphagnum peat moss is in the range of approximately 10 to b 30% by weight.

9. A process for forming the thermal energy storage composition of claim 1 comprising:
    mixing peat moss with an incongruently melting salt hydrate, capable of storing thermal energy as latent heat of phase change, and a nucleating agent; and
    heating the mixture to at least the phase change temperature of the salt hydrate to form a melt which when cooled results in the salt hydrate and nucleating agent being trapped in a network of peat moss.

10. The process as set forth in claim 9 wherein the salt hydrate is the decahydrate of sodium sulphate.

11. The process as set forth in claim 10 wherein the peat moss is mascerated sphagnum peat moss.

12. The process as set forth in claim 11 wherein the nucleating agent is sodium tetraborate decahydrate, contained in the composition in the amount of approximately 3% by weight.

13. The process as set forth in claim 12 wherein at least 7% sphagnum peat moss on a dry weight basis of peat is included.

14. The process as set forth in claim 11 wherein at least 7% sphagnum peat moss on a dry weight basis of peat is included.

15. The process as set forth in claim 13 wherein the moisture content of the sphagnum peat moss is in the range of approximately 10 to 30% by weight.

16. The process as set forth in claim 14 wherein the moisture content of the sphagnum peat moss is in the range of approximately 10 to 30% by weight.

* * * * *